(12) United States Patent
Nalukurthy et al.

(10) Patent No.: US 10,469,443 B2
(45) Date of Patent: Nov. 5, 2019

(54) SYSTEMS AND METHODS FOR RESOLVING DOUBLE ADDRESS FAULTS DURING THE COMMISSIONING OF A CONNECTED SYSTEM

(71) Applicant: Honeywell International Inc., Morristown, NJ (US)

(72) Inventors: RajeshBabu Nalukurthy, Bangalore (IN); Jayesh Agwan, Bangalore (IN); Srivatsa Haridas, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 309 days.

(21) Appl. No.: 15/631,421

(22) Filed: Jun. 23, 2017

(65) Prior Publication Data
US 2018/0375823 A1    Dec. 27, 2018

(51) Int. Cl.
| H04L 29/12 | (2006.01) |
| G08B 25/00 | (2006.01) |
| H04L 12/24 | (2006.01) |
| H04W 64/00 | (2009.01) |
| H04W 88/02 | (2009.01) |

(52) U.S. Cl.
CPC ........ *H04L 61/2046* (2013.01); *G08B 25/003* (2013.01); *H04L 41/0654* (2013.01); *H04L 41/22* (2013.01); *H04W 64/003* (2013.01); *H04W 88/02* (2013.01)

(58) Field of Classification Search
CPC .. H04L 61/2046; H04L 41/22; H04L 41/0654
See application file for complete search history.

(56) References Cited

U.S. PATENT DOCUMENTS

| 7,483,962 | B2 | 1/2009 | Lim et al. |
| 8,284,100 | B2 | 10/2012 | Vartanian et al. |
| 9,137,670 | B2 | 9/2015 | Gray et al. |
| 9,262,915 | B2 * | 2/2016 | Clem .................. G08G 1/0112 |
| 2006/0125644 | A1 | 6/2006 | Sharp |
| 2006/0194568 | A1 | 8/2006 | Sharony |
| 2012/0143495 | A1 | 6/2012 | Dantu |
| 2012/0203453 | A1 | 8/2012 | Lundquist et al. |
| 2012/0232838 | A1 | 9/2012 | Kemppi et al. |
| 2015/0326704 | A1 * | 11/2015 | Ko ...................... H04M 1/7253 455/456.3 |

* cited by examiner

*Primary Examiner* — El Hadji M Sall
(74) *Attorney, Agent, or Firm* — Brooks, Cameron & Huebsch, PLLC

(57) ABSTRACT

Systems and methods for resolving double address faults during the commissioning of a connected system are provided. Some methods can include identifying a subset of a plurality of devices in a region with a double address fault, displaying a first list of the subset, receiving user input selecting one of the subset, identifying a current location of a user, generating a map of the region, wherein the map identifies a respective location of each of the subset and includes visual signs to guide the user from the current location of the user to the respective location of the one of the subset, displaying the map, generating a second list of valid addresses assignable to the one of the subset to address the double address fault, and displaying the second list.

20 Claims, 2 Drawing Sheets

SYSTEMS AND METHODS FOR RESOLVING DOUBLE ADDRESS FAULTS DURING THE COMMISSIONING OF A CONNECTED SYSTEM

FIELD

The present invention relates generally to connected systems. More particularly, the present invention relates to systems and methods for resolving double address faults during the commissioning of a connected system.

BACKGROUND

During the commissioning of a connected system, such as a fire alarm system or any connected home system with internet of things (IoT) devices, a double address fault occurs when two or more devices are assigned the same address, is the most common problem faced, and is often caused by human error. Locating the devices with the duplicate address and fixing the devices with the duplicate address by assigning one of the devices a valid address are time intensive processes that can range from hours to days, depending on the complexity of the network of which the devices are a part.

Locating and fixing the devices with the duplicate address are such time intensive processes because a user must localize the devices, and the known method to physically detect the location of a device and diagnose a double address fault involves referring to printed maps of a region in which the devices are installed. Indeed, there are no known systems and methods that incorporate online maps for navigation and visual guidance to quickly locate devices with a duplicate address. Instead, known systems and methods include recordings and observations on paper, which is time consuming, difficult to read and visualize, could be easily lost or damage, and does not convey the exact location of devices. Furthermore, when a region is large and the network of which the devices are a part are complex, additional users may be needed and deployed to resolve the double address fault within a predetermined period of time. Further still, a user may be confused about how to re-address a device that has a conflicting address with another device and what valid address to use when re-addressing the device.

In view of the above, there is a continuing, ongoing need for improved systems and methods.

DETAILED DESCRIPTION

Figure 1:
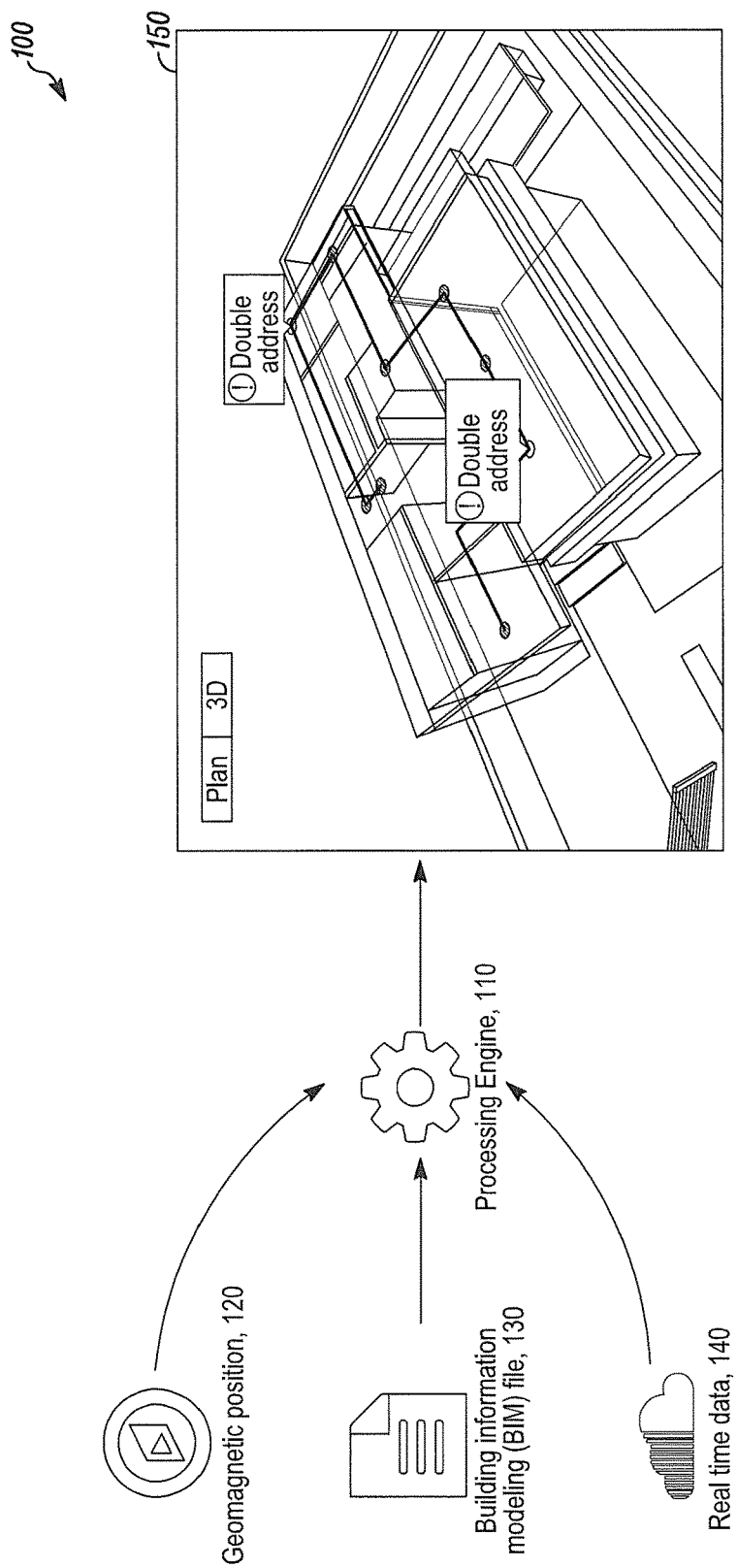
FIG. 1 is a schematic view of a system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for resolving double address faults during the commissioning of a connected system. In accordance with disclosed embodiments, a mobile application can be executed and run on a user's mobile device and use geo-magnetic positioning and three-dimensional map-based visual guidance to provide the user with an accurate location of devices with a double address fault and to assist the user in resolving such faults.

For example, systems and methods disclosed herein can generate and display on a user interface of the mobile device a list of devices with a double address fault, receive user input to select one of the devices on the list, generate and display on the user interface of the mobile device an interactive three-dimensional floor map that identifies the location of the devices with the double address fault, and generate and output visual guidance on the interactive three-dimensional floor map to assist the user in navigating from his current location to the selected one of the devices, for example, by displaying on the interactive three-dimensional floor map clear visual signs identifying the devices with the double address fault, thereby saving the user time in locating the devices. Systems and methods disclosed herein can also generate and display on the user interface of the mobile device a list of valid addresses that can be assigned to the selected one of the devices to resolve the double address fault, for example, by identifying all available valid addresses for the selected one of the devices based on the position of the selected one of the devices in a loop network of which the selected one of the devices is a part.

It is to be understood that the devices as disclosed and described herein can include devices that are part of a fire alarm system, such as a smoke or heat detector, a strobe device, a fire control panel, a manual call point, a fire extinguisher, and the like, or any IoT devices as would be understood by one of ordinary skill in the art. However, embodiments disclosed herein are not so limited and could include any other connected device as would be known and desired by one of ordinary skill in the art.

In accordance with disclosed embodiments, systems and methods disclosed herein can use geo-magnetic positioning to provide the user with the accurate location of the devices with the double address fault with accuracy of less than, for example, 2 meters. For example, systems and methods disclosed herein can collect magnetic sensor data to identify a unique magnetic fingerprint associated with a device in a region and map the pattern, that is, the geo-magnetic position, to a building information model (BIM) file or a floor plan of the region to identify the location of the device in the region. Furthermore, the location of the devices with the double address fault can be digitally stored in a memory device, either locally on the mobile device or remotely on a cloud system or a cloud server so that the location can be recalled on demand and relied upon for location accuracy.

In some embodiments, systems and methods disclosed herein can execute a data acquisition as follows, repeating such an acquisition process as necessary. Systems and methods disclosed herein can retrieve BIM data for a region from an industrial foundation classes (IFC) file and can load the corresponding BIM file or the floor plan of the region referenced therein onto the user's mobile device or the mobile application running thereon. In some embodiments, the BIM data can include metadata for devices installed in the region and architectural and construction details of the region. Systems and methods disclosed herein can also identify the user's current location from a compass or magnetometer sensor of the mobile device, receive user input identifying configuration data for the one or more devices in the region, such as the address of the one or more devices, collect magnetic sensor location data to wirelessly locate one or more devices in the region based on geo-magnetic positioning, map all of the collected and received data to the BIM file or the floor plan to create the three-dimensional floor map of the region that identifies the location of the devices in the region, and store the BIM file or the floor plan with the mapped data thereon in a memory device either locally on the mobile device or remotely on a cloud system or a cloud server.

Once the data acquisition process is complete, systems and methods disclosed herein can receive via the user interface of the user's mobile device user input to initiate a test to check for double address faults for the devices installed in the region. Responsive thereto, systems and methods disclosed herein can access the data stored during the data acquisition process to identify devices with the same address and can display a list of the devices with the same address. Then, systems and methods disclosed herein can receive via the user interface of the user's mobile device user input to select one of the devices with a duplicate address and can display on the user interface of the user's mobile device the three-dimensional interactive floor map with the location of the devices, including the devices with a duplicate address, thereon. Systems and methods disclosed herein can also provide three-dimensional map-based visual guidance to guide the user from his current location to the location of the selected one of the devices and can generate and display on the user interface of the mobile device a list of valid addresses that can be assigned to the selected one of the devices.

FIG. 1 is a schematic view of a system 100 in accordance with disclosed embodiments. As seen in FIG. 1, a processing engine 110 can receive geo-magnetic positioning data 120 for devices in a region, a BIM file 130 of the region, and real time data 140 related to the region and, responsive thereto, output a three-dimensional interactive floor map 150 identifying the location of the devices in the region and identifying which of those devices have a double address fault.

Figure 2:
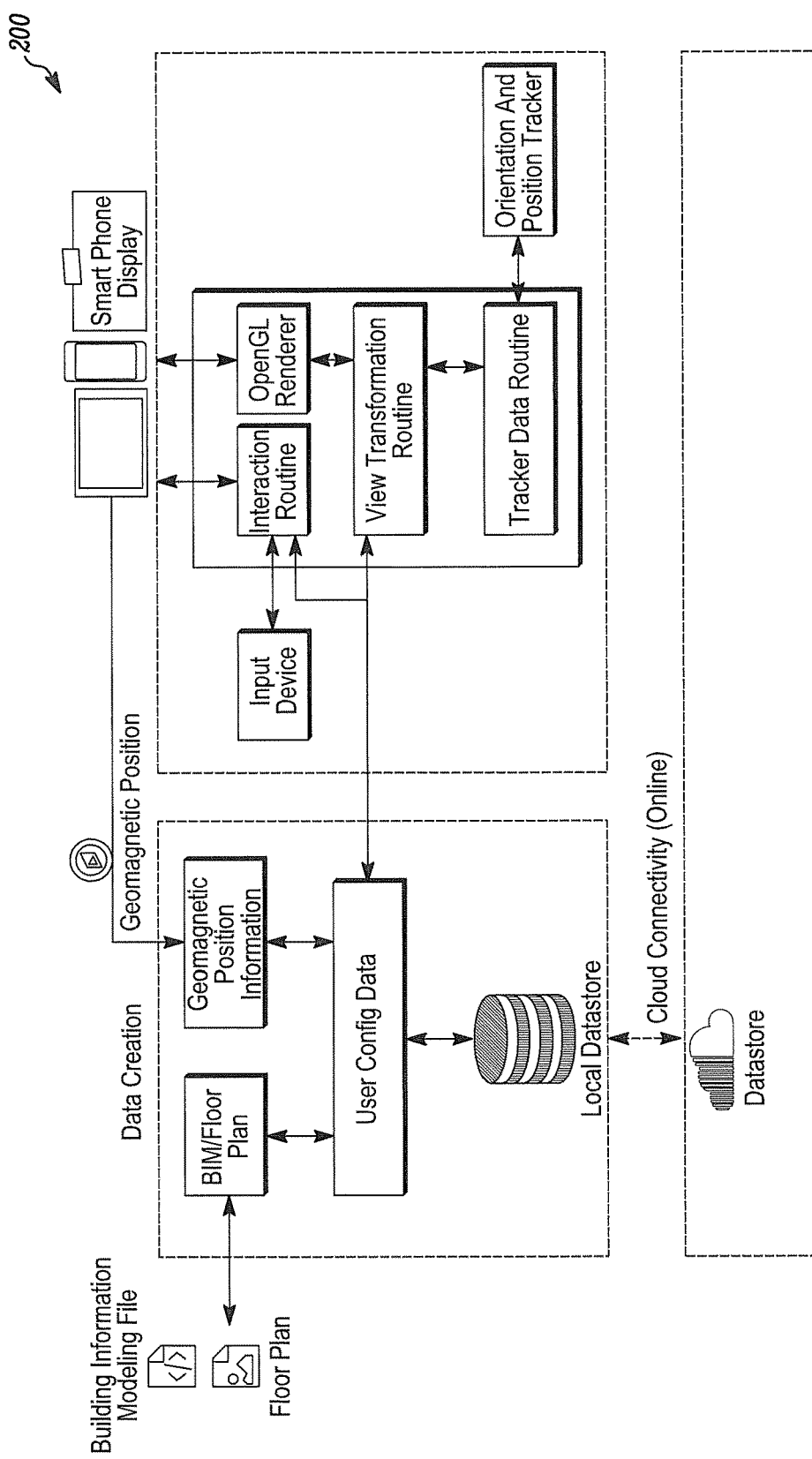
FIG. 2 is a block diagram of a system in accordance with disclosed embodiments.

FIG. 2 is a block diagram of a system 200 in accordance with disclosed embodiments. As seen in FIG. 2, geo-magnetic positioning data for devices in a region, a BIM file or a floor plan of the region, and user configuration data related to the geo-magnetic positioning data, the BIM file, and the floor plan can be stored in a memory device either locally on a mobile device or remotely on a cloud system or a cloud server. As further seen in FIG. 2, a mobile application executing and running on the mobile device can access the stored data to identify the devices in the region with a double address fault, generate and display on a user interface of the mobile device a three-dimensional interactive floor map of the region identifying the location of the devices and identifying which of those devices have a double address fault, generate and display three-dimensional map-based visual guidance on the floor map to navigate from a user's current location to a location of one of the devices, and, responsive to user input selecting the one of the devices, generate and display on the user interface of the mobile device a list of valid addresses that can be assigned to the selected one of the devices to address the double address fault.

It is to be understood that some systems and methods disclosed herein can be executed and controlled by control circuitry, one more programmable processors, and executable control software as would be understood by one of ordinary skill in the art. The executable control software can be stored on a non-transitory computer readable medium, including but not limited to, local computer memory, RAM, optical storage media, magnetic storage media, flash memory, and the like. Some or all of the control circuitry, the programmable processors, and the non-transitory computer readable medium can be incorporated into a mobile device with a user interface device or can be incorporated into a cloud system or a cloud device.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
    identifying a subset of a plurality of devices in a region with a double address fault;
    displaying a first list of the subset of the plurality of devices on a user interface of a mobile device;
    receiving first user input via the user interface of the mobile device selecting one of the subset of the plurality of devices;
    identifying a current location of a user;
    generating a map of the region, wherein the map identifies a respective location of each of the subset of the plurality of devices and includes visual signs to guide the user from the current location of the user to the respective location of the one of the subset of the plurality of devices;
    displaying the map on the user interface of the mobile device;
    generating a second list of valid addresses assignable to the one of the subset of the plurality of devices to address the double address fault; and
    displaying the second list of the valid addresses on the user interface of the mobile device.

2. The method of claim 1 wherein the map is an interactive three-dimensional floor map of the region.

3. The method of claim 1 wherein the second list of the valid addresses includes all available device addresses.

4. The method of claim 1 further comprising identifying the valid addresses based on a position of the one of the subset of the plurality of devices in a loop network of which the plurality of devices are a part.

5. The method of claim 1 further comprising identifying the respective location of each of the plurality of devices based on geo-magnetic positioning each of the plurality of devices.

6. The method of claim 5 further comprising:
    mapping respective geo-magnetic position data for each of the plurality of devices to a BIM file or a floor plan of the region; and
    generating the map of the region based on the respective geo-magnetic position data for each of the plurality of devices mapped to the BIM file or the floor plan of the region.

7. The method of claim 5 further comprising retrieving the respective location of each of the plurality of devices from a memory device.

8. The method of claim 1 further comprising:
    identifying a respective device address of each of the plurality of devices;

identifying duplicate ones of the respective device address of each of the plurality of devices; and identifying the subset of the plurality of devices in the region with the double address fault based on the duplicate ones of the respective device address of each of the plurality of devices.

9. The method of claim 8 further comprising retrieving the respective device address of each of the plurality of devices from a memory device.

10. The method of claim 8 further comprising receiving second user input identifying the respective device address of each of the plurality of devices.

11. A system comprising:
a user interface device;
a programmable processor; and
executable control software stored on a non-transitory computer readable medium,
wherein the programmable processor and the executable control software identify a subset of a plurality of devices in a region with a double address fault,
wherein the user interface device displays a first list of the subset of the plurality of devices,
wherein the user interface device receives first user input selecting one of the subset of the plurality of devices,
wherein the programmable processor and the executable control software identify a current location of a user,
wherein the programmable processor and the executable control software generate a map of the region, wherein the map identifies a respective location of each of the subset of the plurality of devices and includes visual signs to guide the user from the current location of the user to the respective location of the one of the subset of the plurality of devices,
wherein the user interface device displays the map,
wherein the programmable processor and the executable control software generate a second list of valid addresses assignable to the one of the subset of the plurality of devices to address the double address fault, and
wherein the user interface device displays the second list of the valid addresses.

12. The system of claim 11 wherein the map is an interactive three-dimensional floor map of the region.

13. The system of claim 11 wherein the second list of the valid addresses includes all available device addresses.

14. The system of claim 11 wherein the programmable processor and the executable control software identify the valid addresses based on a position of the one of the subset of the plurality of devices in a loop network of which the plurality of devices are a part.

15. The system of claim 11 wherein the programmable processor and the executable control software identify the respective location of each of the plurality of devices based on geo-magnetic positioning each of the plurality of devices.

16. The system of claim 15 wherein the programmable processor and the executable control software map respective geo-magnetic position data for each of the plurality of devices to a BIM file or a floor plan of the region and generate the map of the region based on the respective geo-magnetic position data for each of the plurality of devices mapped to the BIM file or the floor plan of the region.

17. The system of claim 15 further comprising:
a memory device,
wherein the programmable processor and the executable control software retrieve the respective location of each of the plurality of devices from the memory device.

18. The system of claim 11 wherein the programmable processor and the executable control software identify a respective device address of each of the plurality of devices, identify duplicate ones of the respective device address of each of the plurality of devices, and identify the subset of the plurality of devices in the region with the double address fault based on the duplicate ones of the respective device address of each of the plurality of devices.

19. The system of claim 18 further comprising:
a memory device,
wherein the programmable processor and the executable control software retrieve the respective device address of each of the plurality of devices from the memory device.

20. The system of claim 18 wherein the user interface device receives second user input identifying the respective device address of each of the plurality of devices.

* * * * *